United States Patent Office 2,786,850
Patented Mar. 26, 1957

2,786,850

METHOD OF PREPARING 5-(DELTA-CHLOROBUTYL) HYDANTOIN

Harold Conroy, Plainfield, N. J., assignor to Merck & Co., Inc., Rahway, N. J., a corporation of New Jersey No Drawing. Application January 6, 1955,
Serial No. 480,293

5 Claims. (Cl. 260—309.5)

This invention relates to the production of 5-(delta-chlorobutyl) hydantoin. More particularly, it is concerned with a new method of preparing 5-(delta-chlorobutyl) hydantoin.

The compound 5-(delta-chlorobutyl) hydantoin is of value as an intermediate in the synthesis of the essential amino acid lysine. Since lysine, alpha, epsilon-diamino-caproic acid cannot be synthesized, at least in sufficient quantities, by animals, and must be obtained from external sources, it is of major commercial importance for supplementing animal feed stuffs.

Pursuant to processes described in the art, 5-(delta-chlorobutyl) hydantoin can be converted to 5-(delta-aminobutyl) hydantoin by reaction with ammonia, and the aminobutyl hydantoin compound can then by hydrolyzed by heating with acids or bases to obtain lysine.

One object of the present invention is to provide a new process suitable for the production of 5-(delta-chlorobutyl) hydantoin on a commercial scale. A further object is to provide a method of converting 5-(delta-hydroxybutylidene) hydantoin to 5-(delta-chlorobutylidene) hydantoin. Another object is to provide a process for the reduction of 5-(delta-chlorobutylidene) hydantoin to 5-(delta-chlorobutyl) hydantoin. These and other objects of my invention will be apparent from the detailed description hereinafter provided.

In accordance with my present invention, it is now found that 5-(delta-chlorobutyl) hydantoin can be prepared by hydrogenating 5-(2-furyl) hydantoin to obtain 5-(tetrahydro-2-furyl) hydantoin; reacting said tetrahydrofuryl hydantoin with a base to produce 5-(delta-hydroxybutylidene) hydantoin; reacting said hydroxybutylidene hydantoin with thionyl chloride to produce 5-(delta-chlorobutylidene) hydantoin; and intimately contacting said chlorobutylidene hydantoin with hydrogen in the presence of a hydrogenation catalyst to obtain 5-(delta-chlorobutyl) hydantoin. These reactions can be shown as follows:

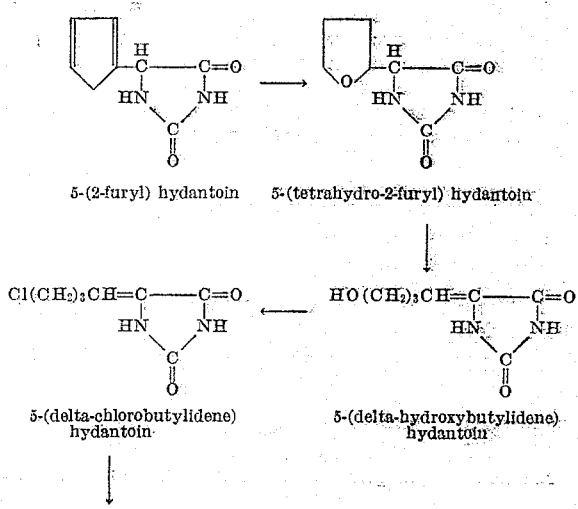

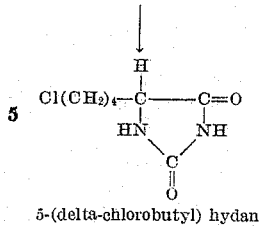

5-(delta-chlorobutyl) hydantoin

The starting compound 5-(2-furyl) hydantoin can be prepared by the reaction of furfural with ammonium carbonate and potassium cyanide. Since furfural is inexpensive and readily available, 5-(2-furyl) hydantoin is indeed a convenient starting material for the synthesis of lysine.

In the first step of my process, the 5-(2-furyl) hydantoin is reacted with hydrogen in a medium having a pH not in excess of 7.0 in the presence of a hydrogenation catalyst such as noble metals, noble metal oxides, or Raney nickel to produce the corresponding tetrahydro compound. This reduction is most conveniently effected in the presence of a suitable solvent for 5-(2-furyl) hydantoin such as water, lower aliphatic alcohols, or aqueous-lower aliphatic mixtures. Although the reaction can be carried out at temperatures ranging from about room temperature to about 150° C., I prefer to carry out this step at a temperature of about 50–100° C., since at these temperatures the reaction is rapid and the reduced product contains a minimum of by-products. The reduction can be effected at either atmospheric or superatmospheric pressures, although I usually find it convenient to employ a moderate pressure of about 10–50 p. s. i. g., since under these conditions the reaction is rapid and the use of expensive, high-pressure equipment is avoided.

The desired 5-(tetrahydro-2-furyl) hydantoin is conveniently recovered from the resulting hydrogenation mixture by removing the catalyst and evaporating the resulting solution to dryness under reduced pressure. The product so obtained can be used directly in the next step of my process, although, if desired, it can be readily purified further by recrystallization from a suitable solvent such as ethanol.

The second step of my process is carried out by heating the tetrahydrofuryl hydantoin with a base to cleave the tetrahydrofuryl ring and form 5-(delta-hydroxybutylidene) hydantoin. This is conveniently accomplished by heating the tetrahydrofuryl hydantoin in the presence of an aqueous solution of an inorganic base, such as alkali metal hydroxide, or an alkali metal carbonate on a steam bath for sufficient time to complete the reaction. The course of the reaction and the formation of the desired hydroxybutylidene hydantoin can be conveniently followed by determining the ultra-violet absorption of the reaction mixture. The 5-(delta-hydroxybutylidene) hydantoin formed by this cleavage reaction is recovered by cooling the reaction mixture whereupon crystals of the desired product separate and can be recovered by filtration or centrifugation.

In the next step of my process the hydroxybutylidene hydantoin is converted to the chlorobutylidene hydantoin. This step of my process is conveniently effected by reacting the hydroxybutylidene hydantoin with thionyl chloride at a temperature not in excess of about 150° C. Generally, I find it desirable to carry out the reaction in a suitable non-reactive solvent such as toluene, xylene, and the like. Thus, the reaction is conveniently effected by heating a mixture of toluene, hydroxybutylidene hydantoin, and thionyl chloride at a temperature of about 85–110° C., the heating being continued until no more sulfur dioxide is evolved. The chlorobutylidene hydantoin formed in the reaction separates as a crystalline product from the mixture and can be recovered by filtration or centrifugation. The product so obtained can be used in the next step of my process, although, if desired, it can be purified further by recrystallization from water.

In this process of preparing the chlorobutylidene hydantoin, I find it desirable to add a minor amount of an amine to the reaction mixture to catalyze the reaction. Examples of suitable catalysts for this purpose that might be mentioned are pyridine, dimethyl aniline, methyl amine, dimethyl amine, and the like. Although the reaction can be effected without the amine catalyst, the presence of a small amount of amine is advantageous in initiating the reaction.

In the final step of my process the 5-(delta-chlorobutylidene) hydantoin is hydrogenated to obtain the desired chlorobutyl hydantoin. This reduction is effected by intimately contacting the chlorobutylidene hydantoin with hydrogen in the presence of a hydrogenation catalyst at room temperature; the product being recovered from the resulting reaction mixture by removing the catalyst and evaporating the resulting solution to dryness under reduced pressure.

Thus, the reduction can be carried out by reacting the chlorobutylidene hydantoin in a suitable non-reactive solvent with hydrogen in the presence of a hydrogenation catalyst such as the noble metals, noble metal oxides, or Raney nickel at temperatures ranging from room temperature to about 150° C. at either atmospheric or superatmospheric pressures. Usually, I find it more convenient to carry out the reduction at low pressures since the reaction is rapid under these conditions and the use of expensive, higher-pressure equipment is avoided. For example, the reduction is readily effected by intimately contacting a solution of 5-(delta-chlorobutylidene) hydantoin in ethanol containing a small amount of platinum oxide with hydrogen at atmospheric pressure and room temperature. After completion of the reduction the chlorobutylidene hydantoin is recovered by removing the catalyst, evaporating the filtrate to dryness and recrystallizing the residue from water.

The following examples are presented to illustrate the process of my invention:

EXAMPLE 1

*Preparation of 5-(delta-hydroxybutylidene) hydantoin*

Twenty grams (0.1085 M) of recrystallized 5-(2-furyl) hydantoin monohydrate in 200 ml. of water was hydrogenated at 80° C. in the presence of 1.3 gms. of 5% palladium on charcoal, at an initial hydrogen pressure of 30 p. s. i. g. The batch consumed 0.229 M of hydrogen (105% of theory) in two to three hours.

After cooling to room temperature, the mixture was filtered. To the filtrate containing the 5-(2-tetrahydrofuryl) hydantoin was added 250 mgms. (0.00625 M, 5 M % of starting material) of sodium hydroxide. The solution was heated on the steam bath for 7½ hours. Every hour a 1 mg. sample was taken to follow the course of the reaction by ultraviolet absorption assay. The results were as follows:

1. 0.5 hr. Amount of product present: 26.7% of theory
2. 1.0 hr. Amount of product present: 52.8% of theory
3. 2.0 hr. Amount of product present: 71.2% of theory
4. 3.0 hr. Amount of product present: 76.5% of theory
5. 4.0 hr. Amount of product present: 80.2% of theory
6. 5.0 hr. Amount of product present: 82.0% of theory
7. 6.0 hr. Amount of product present: 85.5% of theory
8. 7.0 hr. Amount of product present: 88.2% of theory On cooling the solution to room temperature, crystals of 5-(delta-hydroxybutylidene) hydantoin separated. The mixture was aged in an ice bath for one hour, and filtered. The white solid was washed with a small amount of cold water and dried. This first crop weighed 8.135 gms. (44%), M. P. 185.0–187.5° C.; λ max 2200, E%=481, λ max 2740, E%=481, λ max 2740, E%=732 (in water).

A second crop of less pure 5-(delta-hydroxybutylidene) hydantoin was obtained by concentrating the mother liquors to 50 ml., cooling, aging in ice for an hour, and filtering off the crystals so obtained. The yield of crop 2 was 3.72 gms. (20.2%), M. P. 175–179° C.; λ max 2200, E%=475, λ max 2740, E%=722.

When the mother liquors of the second crop were concentrated to 10 ml., a third crop of the product was obtained, which was worked up in the same manner. The yield of crop 3 was 1.645 gms. (8.9%), M. P. 151–160° C.

EXAMPLE 2

*Preparation of 5-(delta-chlorobutylidene) hydantoin from 5-(delta-hydroxybutylidene) hydantoin*

A mixture of 5-(delta-hydroxybutylidene) hydantoin (271.8 g.), 1500 cc. of toluene, 1.5 ml. of pyridine and 134 ml. of thionyl chloride was heated rapidly to 85–90° C. with good stirring. The solid gradually melted, being replaced by a heavy oil. After about ½ hour at 85–90° C., crystallization occurred. The temperature was then raised to reflux (110°) and kept there until no more SO₂ was evolved (about ½ hour). The mixture was allowed to cool overnight, then aged in the ice bath for one hour. The solid 5-(delta-chlorobutylidene) hydantoin was filtered off; washed with toluene, and dried to constant weight. The yield was 298.5 g. (99%).

EXAMPLE 3

*Preparation of 5-(delta-chlorobutyl) hydantoin from 5-(delta-chlorobutylidene) hydantoin*

One gram of 5-(delta-chlorobutylidene) hydantoin in 30 ml. of ethanol with 0.1 g. of platinum oxide was hydrogenated at atmospheric pressure. The batch took up 91.5% of the required amount of hydrogen in 46 minutes, and took up no more after an additional two hours. The catalyst was filtered off, and the filtrate concentrated to dryness. The residue was recrystallized from about 5 ml. of hot water. The yield was 0.898 g. (89%) of 5-(delta-chlorobutyl) hydantoin with M. P. 128–131° C.

Various changes and modifications may be made in carrying out the present invention without departing from the spirit and scope thereof. Insofar as these changes and modifications are within the scope of the appended claims, they are to be considered as part of this invention.

I claim:

1. The process which comprises intimately contacting 5-(delta-hydroxybutylidene) hydantoin with thionyl chloride to obtain 5-(delta-chlorobutylidene) hydantoin, and intimately contacting said chlorobutylidene hydantoin with hydrogen in the presence of a hydrogenation catalyst to produce 5-(delta-chlorobutyl) hydantoin.

2. The process which comprises intimately contacting 5-(delta-hydroxybutylidene) hydantoin with thionyl chloride to produce 5-(delta-chlorobutylidene) hydantoin, and treating said chlorobutylidene hydantoin with hydrogen in the presence of platinum catalyst to produce 5-(delta-chlorobutyl) hydantoin.

3. The process which comprises intimately contacting 5-(delta-chlorobutylidene) hydantoin with hydrogen in the presence of a hydrogenation catalyst to produce 5-(delta-chlorobutyl) hydantoin.

4. The process which comprises intimately contacting 5-(delta-chlorobutylidene) hydantoin with hydrogen in the presence of a noble metal catalyst to produce 5-(delta-chlorobutyl) hydantoin.

5. The process of claim 3 wherein the catalyst is platinum oxide.

References Cited in the file of this patent

UNITED STATES PATENTS

| | | |
|---|---|---|
| 2,557,904 | Britton et al. | June 19, 1951 |
| 2,564,647 | Rogers | Aug. 14, 1951 |
| 2,564,649 | Rogers | Aug. 14, 1951 |